United States Patent [19]

Curzon

[11] Patent Number: 4,859,400

[45] Date of Patent: Aug. 22, 1989

[54] NUCLEAR REACTOR CORE RESTRAINT

[75] Inventor: Andrew F. Curzon, Heaton Moor, United Kingdom

[73] Assignee: National Nuclear Corporation Ltd., Knutsford, United Kingdom

[21] Appl. No.: 106,590

[22] Filed: Oct. 13, 1987

[30] Foreign Application Priority Data

Nov. 3, 1986 [GB] United Kingdom ................. 8626238

[51] Int. Cl.[4] ........................... G21C 1/00; G21C 9/00
[52] U.S. Cl. .................................... 376/172; 376/302; 376/362; 376/448
[58] Field of Search ............... 376/172, 173, 302, 175, 376/176, 362, 364, 448, 365, 363

[56] References Cited

U.S. PATENT DOCUMENTS

| | | |
|---|---|---|
| 3,671,394 | 6/1972 | Bernath et al. . |
| 3,708,393 | 1/1973 | Waymire et al. . |
| 3,753,856 | 8/1973 | Ash . |
| 3,893,886 | 7/1975 | Aubert et al. . |
| 3,992,256 | 11/1976 | Lleres et al. . |
| 4,050,986 | 9/1977 | Ference et al. . |
| 4,135,974 | 1/1979 | Garkisch et al. . |
| 4,152,207 | 5/1979 | Cooper . |
| 4,198,272 | 4/1980 | Salmon . |

Primary Examiner—Harvey E. Behrend
Attorney, Agent, or Firm—William R. Hinds

[57] ABSTRACT

A nuclear reactor fuel core assembly comprises an array of sub-assemblies comprising a central zone of fuel/breeder sub-assemblies (20F) surrounded by an annular zone of shielding sub-assemblies (20S). The fuel/breeder sub-assemblies (20F) are flexibly mounted from the reactor diagrid top plate 26 while the shielding sub-assemblies (20S) are mounted as stiff cantilevers so as to provide resilient restraint against bow of the central sub-assemblies (20S) during reactor operation, the restraint being exerted via abutment pads (40) at the level of the tops of the sub-assemblies (20S, 20F). The central core sub-assemblies (20F) also have abutment pads (34) at a lower level to form a lower restraint plane at this level controlling sub-assembly bowing in the central core zone.

8 Claims, 7 Drawing Sheets

NUCLEAR REACTOR CORE RESTRAINT

This invention relates to nuclear reactors and has particular application to the cores of liquid metal cooled fast neutron reactors (fast reactor).

Typically the core of fast reactor comprises an array of generally vertically disposed sub-assemblies each comprising a metal tubular wrapper of hexagonal cross-section provided with a spike at the lower end thereof for engagement in a support structure (generally known as the reactor diagrid), the sub-assemblies prior to operation of the reactor being supported in the array with gaps between each sub-assembly and its neighbours. The core in simplistic terms may be considered to comprise a central section comprising sub-assemblies which contain bundles of nuclear fuel pins (herein called fuel sub-assemblies) and an outer annular section of sub-assemblies containing neutron absorbing or reflecting material (herein called shield sub-assemblies). Where the reactor is required to breed fissile fuel material from fertile fuel material in the course of irradiation, the fuel section of the core may comprise radial and/or axial zones of fertile fuel material embodied within separate and/or the same sub-assemblies as those containing the fissile fuel material.

Amongst the problems faced by the fast reactor designer are the phenomena of swelling by void formation and irradiation creep, both of which result from neutron bombardment of metal components in the core of a fast reactor. These phenomena are the consequence of high fast neutron flux and flux gradients and, together with the high temperatures and temperature gradients prevailing within the core during reactor operation, lead to distortion of the sub-assemblies. In particular, because the sub-assembly sides nearer to the core centre will swell to a greater extent than those further away, the tubular wrapper develops a bow with a curvature which is convex towards the core centre. Another effect observed is wrapped dilation, ie the initial wrapper hexagonal cross-section increases in size due to neutron-induced void swelling and distorts towards circularity due to irradiation creep under the net outwards pressure exerted by coolant flowing through the wrapper. As a result of these effects the whole core will tend towards a wheatsheaf configuration which leads to difficulties such as insertion of control rods from above the core into designated locations with the core, and sub-assembly pick-up and sub-assembly handling during refuelling.

As will be explained hereinafter with reference to FIGS. 1 and 2, various approaches have been adopted in the past to restrain the core. The present invention seeks to provide an improved core restraint system.

According to the present invention there is provided a nuclear reactor core assembly comprising an array of core sub-assemblies of which a first group forms a central core zone and a second group forms an annular outer core zone surrounding the central core zone, each sub-assembly of both groups comprising an elongate tubular wrapper provided at its lower end with a spike formation which engages in a support structure for supporting the sub-assemblies of both groups in upright parallel relationship and at its upper end with first abutment surfaces for contact with the corresponding first abutment surfaces of neighbouring subassemblies so as to form an upper restraint plane for the sub-assemblies of both groups, characterised in that: at a level below the upper restraint plane, the wrappers of the first group of sub-assemblies, but not of the second group of sub-assemblies, are each provided with second abutment surfaces for contact with the corresponding second abutment surfaces of neighbouring sub-assemblies of the first group so as to form a lower restraint plane effective only for the sub-assemblies of the first group; each of the sub-assemblies of the first group has a connection between the wrapper and the respective spike formation allowing tilting of the wrapper relative to the spike formation; and each of the sub-assemblies of the second group has a connection between the wrapper and the respective spike formation which is stiffer than the connection aforesaid so that each second group sub-assembly, being subject by virtue of the stiffer connection to greater restraint against tilting of the wrapper relative to the spike formation, acts as a cantilever beam which, on take up of clearance between the first and second abutment surfaces, radially restrains the sub-assemblies in-board thereof, the radial restraint exerted by the second group sub-assemblies being effective for the first group sub-assemblies via the upper restraint plane.

The radial constraint may be provided exclusively by the inherent bending stiffness of the second group sub-assemblies or it may be supplemented by at least one ring encircling the second group of sub-assemblies. In the latter event, the vertical position of the or each ring can be selected in accordance with the spring constant required from the boundary beyond the central core zone. Thus, the ring may be located at the level of the upper restraint plane or at lower levels.

The lower restraint plane is preferably located above the upper boundary of the fissile material-containing zone of the core. Where the core also embodies an axial zone of fertile material above the fissile zone, the lower restraint plane is preferably located above the upper boundary of this axial zone of fertile material.

In a presently preferred embodiment, the first group sub-assemblies is divided into two sub-groups, a first containing fissile fuel and a second containing fertile fuel only, and the second sub-group being arranged to encircle the first sub-group and form a radial breeder blanket. The first sub-group may also contain fertile fuel as well as fissile fuel, the fertile fuel in this case being arranged to form axial breeder blankets above and below the fissile zone of the core.

The thick-section portions of the sub-assemblies will typically comprise heavy, machined components which may act as lifting heads by means of which the sub-assemblies can be gripped during refuelling or other procedures involving remote handling of the sub-assemblies.

To promote further understanding of the invention, reference is now made to the accompanying drawings in which.

Figure 6:
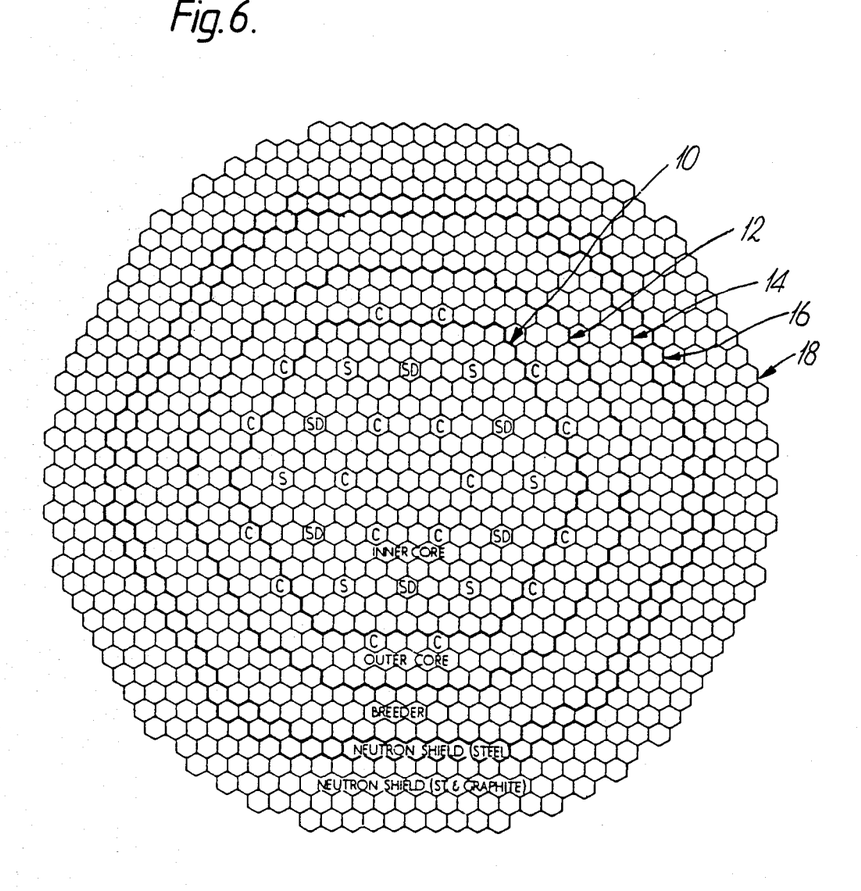
FIG. 6 is a plan view showing the layout of the reactor core.

Referring firstly to FIG. 6, this illustrates one design of core assembly for a liquid metal cooled fast neutron reactor and will be seen to comprise a large array of sub-assemblies organised into different zones comprising an inner core zone 10, an outer core zone 12, a breeder zone 14, a steel pin-containing neutron shield 16 and an inner graphite filled neutron shield 18. For present purposes, all of the sub-assemblies may be regarded as being of essentially the same design in the sense that they each comprise a hexagonal tubular thin-section wrapper 20 (see for example FIG. 1) having a thick section lifting head 22 at the upper end and a spike 24 of cylindrical section at the lower end. There are in fact significant differences between the different types of sub-assembly but these differences are not material as far as understanding of the present invention is concerned and will not therefore be described.

The sub-assemblies in the zones 10, 12 and 14 all contain nuclear fuel material enclosed in bundles of fuel pins. By "nuclear fuel material" is meant both fissile and fertile material. The sub-assemblies of zones 10 and 12 may contain fissile material of differing enrichments along with fertile material disposed above and below the fissile material to form upper and lower axial breeder blankets. The sub-assemblies of zone 14 may contain fertile material only to form a radial breeder blanket encircling the fissile material in zones 10, 12. At various sites, designated C, SD, S within and around the zones 10, 12 the array includes neutron absorber sub-assemblies for operating rods, primary shutdown rods and alternative shutdown rods. For the purposes of the following description, the sub-assemblies of the array will be referred to as fuel sub-assemblies or shield sub-assemblies according to whether they lie within zones 10, 12, 14 or zones 16, 18 respectively. To distinguish between the two categories of sub-assembly, the suffixes F (fuel) and S (shield) are used in the drawings.

Figure 1A:
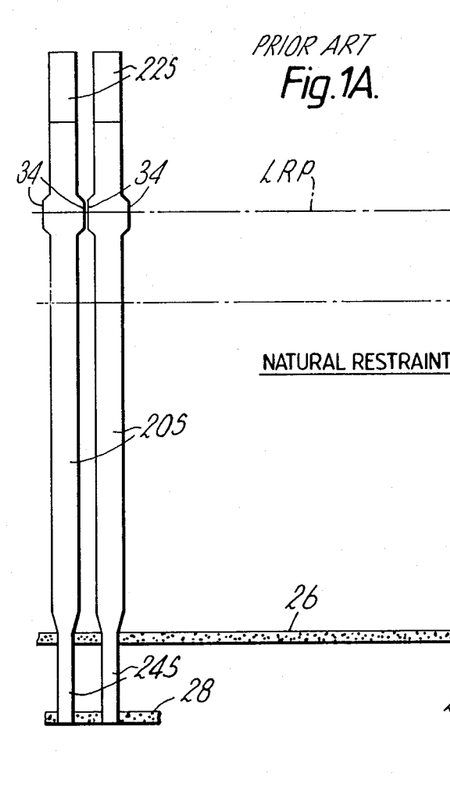
FIGS. 1A and 1B comprise a diagrammatic, composite view illustrating existing core configurations with the left hand side of the figure illustrating the natural restraint approach and the right hand side illustrating the barrel restraint approach.

FIG. 1A illustrates the so-called natural restraint or free standing core restraint system which has been used in French fast neutron reactor designs. In this system, all of the sub-assemblies of the core are long non-articulated spikes 24F, S and are vertically cantilevered from the core support structure or diagrid by engagement of the spikes 24F, S in the top and bottom plates 26, 28 of the diagrid. The vertical and horizontal centre lines of the fissile/fertile core zone are depicted by reference numerals 30, 32. Outwardly embossed spacer pads 34 are pressed outwardly from the thin section walls of the wrappers at locations within or just above the fissile/fertile core zone. At the time of installation, there will be clearance between the pads 34 of each sub-assembly wrapper and its neighbours, but, in the course of irradiation with consequent neutron-induced voidage swelling, irradiation creep and thermal expansion effects, the sub-assemblies are free to bow outwardly (towards a wheatsheaf configuration) to close up the clearances and bring the pads 34 into contact along a generally horizontal restraint plane LRP. Because of the neutron flux distribution across the core, the tendency towards wrapper bowing is more pronounced inwardly of the neutron shield zones. Thus, as wrapper bow develops the inter pad clearances between the fuel sub-assemblies are taken up and they then begin to interact with the shield sub-assemblies as a result of abutment between the spacer pads. The rows of shield sub-assemblies, in turn act essentially as soft springs to absorb and diffuse the loads produced by sub-assembly bowing. High bending stresses in the fuel sub-assemblies are prevented by irradiation creep, which occurs in the presence of the contact loads and by the frictional sliding at contract points.

A feature of the natural restraint system is the relatively low loading and stressing occurring at the contact pads 34. This is of value in view of the fact that the pads are pressed out of the thin section wrapper walls and may therefore have limited load-carrying capability in circumstances where large loads can occur, eg under seismic conditions. Thus, the natural restraint system is characterised by loads and stresses in the wrapper well below the limits that can be tolerated. However, against this there are a number of drawbacks. In particular, the top ends of the sub-assemblies undergo relatively large displacements which lead to difficulties in accurate location of the sub-assembly tops which complicates refuelling and correct registry of the absorber rods with their corresponding sub-assemblies C, SD and S. Other difficulties that arise include high spike reactions and spike attachment stresses which, because the spikes are stiff, lead to high extraction loads in the course of withdrawing sub-assemblies away from the diagrid.

Figure 1B:
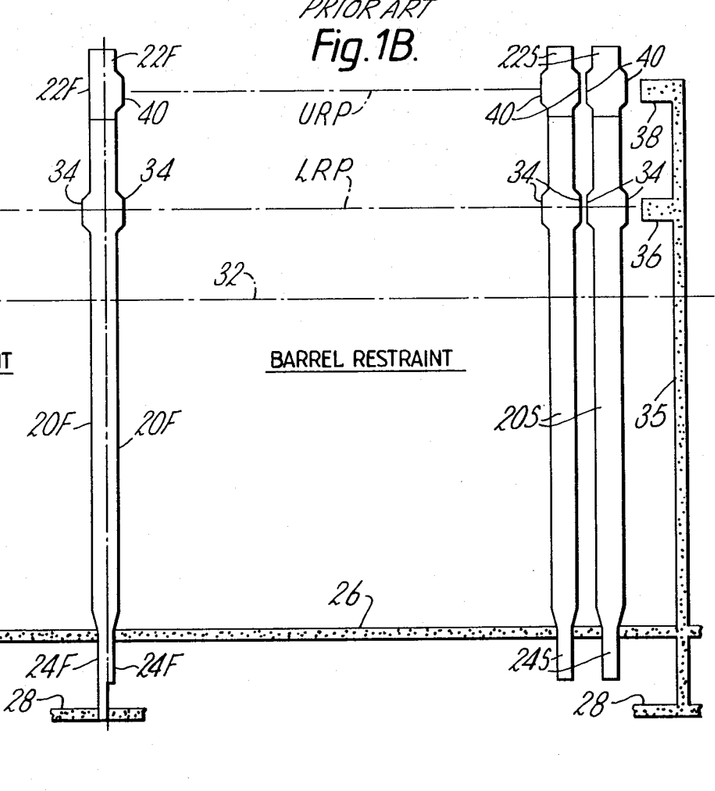

FIG. 1B illustrates the passive or barrel restrained core system. This system is characterised by: (a) the use of shorter spikes 24F, S which are connected with the associated wrapper 20F, S via a flexural articulated joint; and (b) the use of a rigid annular restraint structure, encircling the core. Thus, in the passive restraint system design of FIG. 1B, the restraint structure comprises a barrel 35 mounting components designed to complement the outer surface of the outermost sub-assembly layer, which components form upper and lower rings 38, 36 having substantial hoop strength. The system, in addition to employing spacer pads 34 in a restraint plane LRP above the level of the fissile/fertile core zone, also employs a second higher series of spacer pads 40 in an upper restraint plane URP. In this case the pads 40 form part of the machined thick-section lifting head 22F, S and can therefore withstand significantly larger loading than the pads 34. The restraint rings 36, 38 are aligned with the upper and lower restraint planes URP and LRP. In the drawings the short spikes are illustrated diagrammatically since their detailed structure is not of significance to an understanding of the invention—however, an example of a flexural, articulated spike sub-assembly design can be seen in British Patent No. 1582192 from which the view in FIG. 7 is taken.

Figure 7:
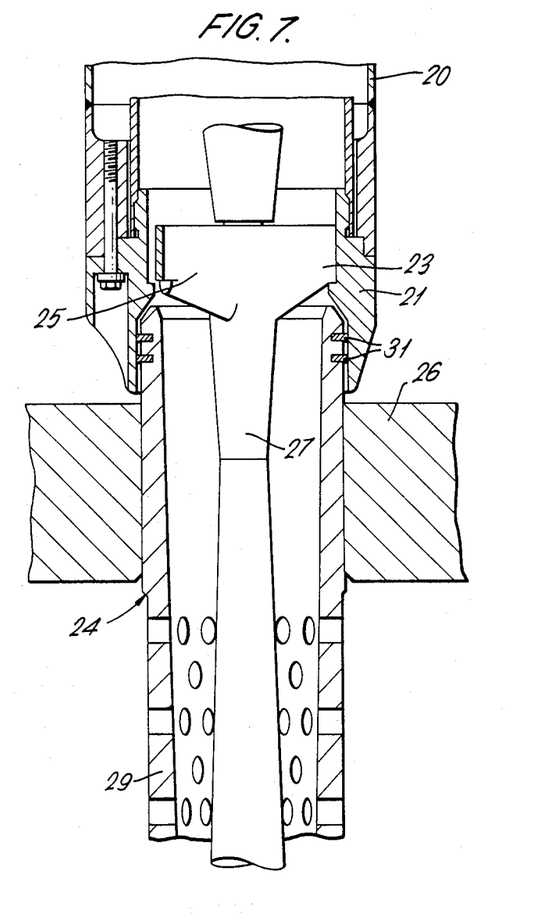
FIG. 7 is a fragmentary view, mainly in longitudinal section, of one form of connection to allow tilting of the sub-assembly wrapper relative to the spike formation.

In FIG. 7 there is indicated at 21 a lower end mounting ring, externally of hexagonal shape, for the wrapper 20 of one of the sub-assemblies with a flexural articulated joint. In the ring 21 are secured by welding the legs 23 of a spider 25 forming the upper end of a spike bar 27 which reduces in cross section for a minor portion of its length downwardly, and then increases over the remainder of its length. The combination of the spike bar 27 within a mounting above 29 constitutes the spike 24 engaged in the top plate 26, the bar and sleeve being rigidly connected to one another at their bottom ends (not shown). The bar constitutes a tie member between the wrapper 20 and the spike 24 and the specific shape of the bar is chosen so that it possesses a desired degree of flexibility, relative movement between the wrapper and the sleeve 29 of the spike being permitted by a pair of resilient split sealing rings 31 which perform a sealing function with only a controlled leakage. This flexibility is such as to afford the flexural articulation required for present purposes in the subassembly design and reference should be made to the aforementioned British patent for any further detail.

With the barrel restraint system, the restraint is primarily provided by the barrel 35 which suppresses the outward deflection of the sub-assembly tops caused by thermal and irradiation bow. The loads induced are reacted by the rings 36, 38 in hoop tension at the lower and upper restraint planes LRP and URP. Thus compared with the natural restraint system, the sub-assembly tops suffer relatively small lateral displacements with obvious benefits in terms of absorber rod registry and lifting head location for refuelling purposes. Also, the use of the flexural articulated spikes, coupled with the greater degree of constraint imposed on sub-assembly displacement, lead to lower peak extraction loads on the spikes during withdrawal out of the diagrid. On the other hand, the loads that develop in the LRP and URP are significantly greater than with the natural restraint system and whilst this is not particularly problematic in the URP where substantial loadings can be tolerated by the thick section lifting heads 22F,S, the inter-pad loads prevailing in the LRP may peak at values approaching the limits of acceptability with potential for pad damage in extreme circumstances such as seismic events.

Figure 2:
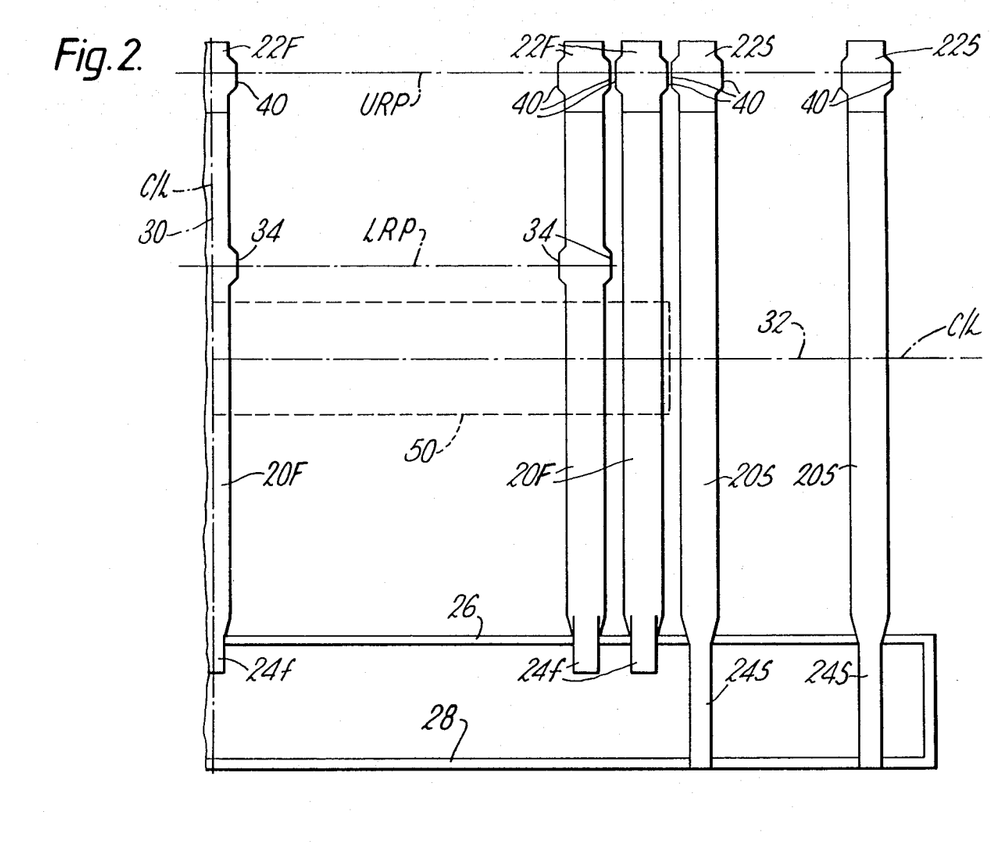
FIGS. 2, 3, 4 and 5 are similar diagrammatic views illustrating examples of various possible forms of compliant restraint in accordance with the invention.

FIG. 2 illustrates an embodiment in accordance with the invention which seeks to secure at least some of the advantages of the barrel restraint system while avoiding or reducing the effect of the above-mentioned drawback. As shown, the fuel sub-assemblies 20F are inserted in the diagrid via short, flexural articulated spikes 24F, as in the case of the barrel restraint system. In contrast with the latter system however, the shield sub-assemblies are mounted from the diagrid in cantilever fashion via the long stiff spikes 24S so that the increased bending stiffness of the shield sub-assemblies provides restraint against sub-assembly bow. As in the barrel restraint system, the sub-assemblies are all provided with spacer pads 40 forming, on take-up of clearances, an upper restraint plane URP extending across the entire core. A lower restraint plane LRP is provided above the fissile/fertile core zone (where boundary is indicated in broken outline by reference numeral 50) by provision of pads 34 pressed out from the wrapper walls but, in this instance, the LRP is limited to the fuel sub-assembly zones 10, 12, 14 of the core. Also, in contrast with the barrel restraint system the embodiment of FIG. 2 does not incorporate restraint rings; instead the restraint is provided primarily by the bending stiffness of the shield sub-assemblies.

It will be seen that, with the embodiment of FIG. 2, the loads that develop in the LRP are in effect transferred to the URP and are reacted at this level by the bending stiffness of shield sub-assemblies thereby reducing the loads and stresses induced in the pads 34 compared with those prevailing in the barrel restraint system. With such an arrangement, the radial restraint imposed by the shield sub-assemblies does not act directly along the LRP but is applied as a moment with the result that less substantial interpad loads are developed in the LRP than if the radial restraint is applied directly at the same level as the pads 34.

Figure 3:
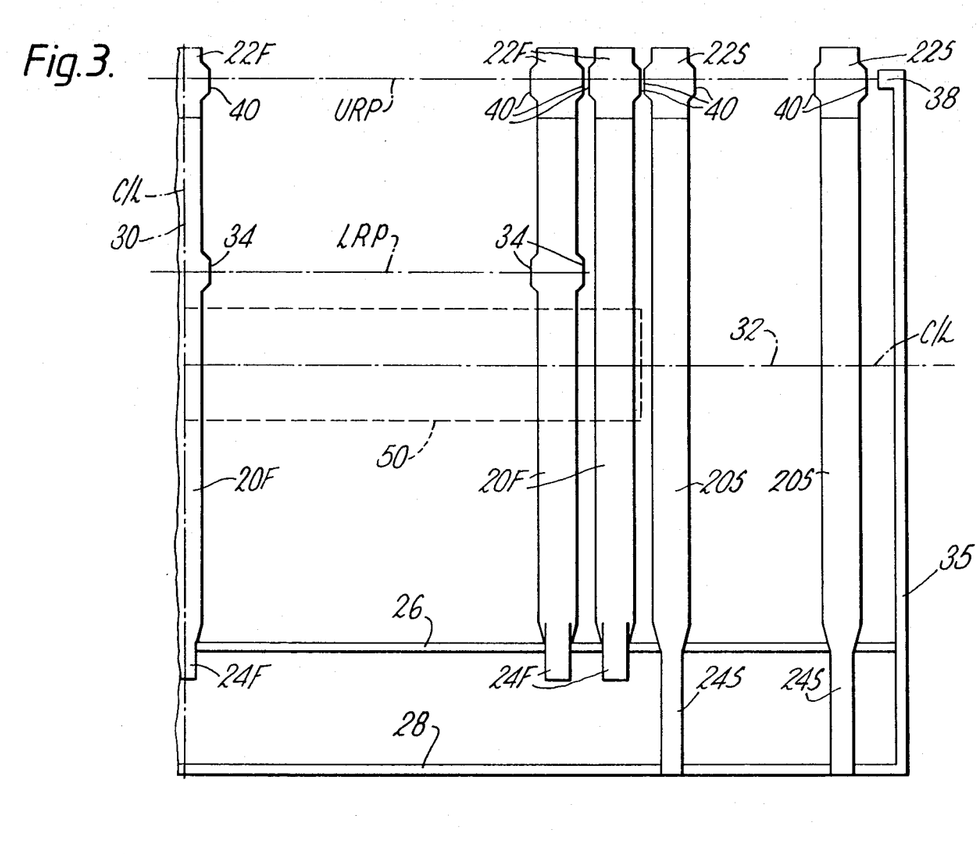

FIG. 3 illustrates a similar embodiment to that of FIG. 2 in which a barrel 35 with URP restraining ring 38 is employed. In contrast with a conventional barrel restraint system, the gap between the outermost pads 40 and the ring 38 may be relatively large so that the shield sub-assemblies do not contact the ring 38 until they have undergone substantial bending. Thus, the radial restraint is, for the most part, provided by the bending stiffnesses of the shield sub-assemblies and the restraint ring 38 may only be effective when the core has undergone a predetermined amount of radial expansion. The invention can therefore accommodate wrappers made from low or zero swelling materials or high swelling materials.

Figure 4:
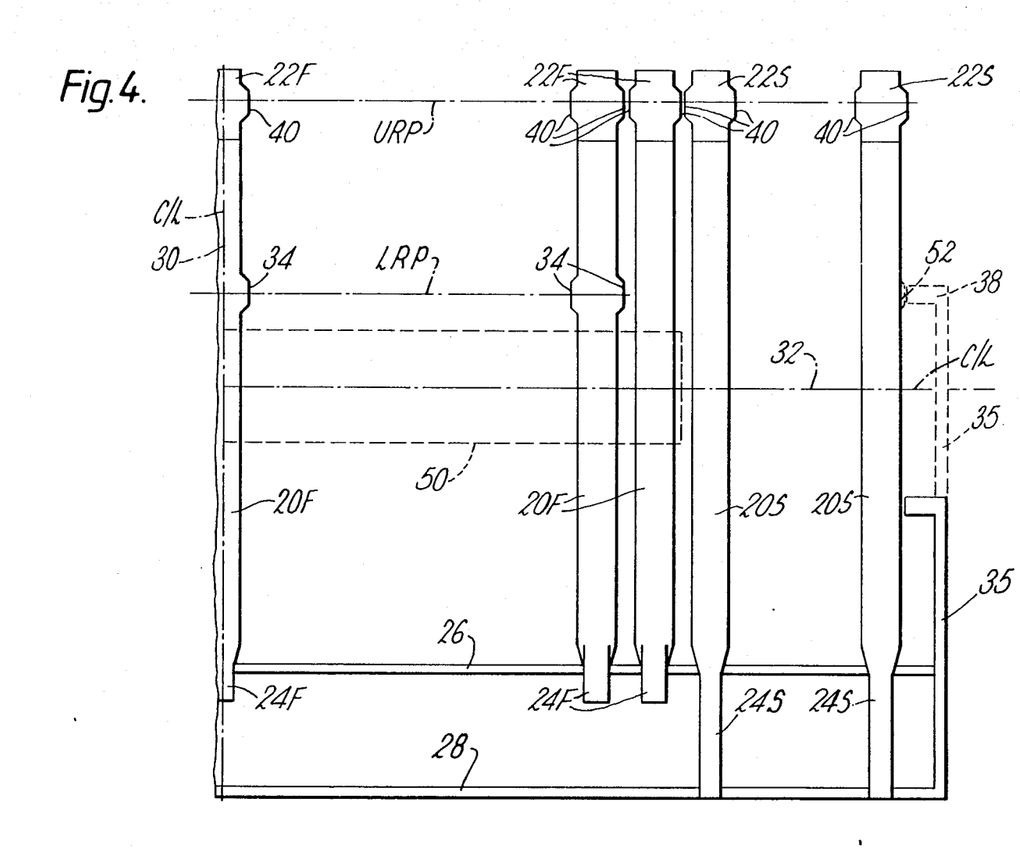

FIG. 4 illustrates another embodiment according to the invention in which a barrel 35 with a restraint ring 38 is incorporated but at a lower level than the URP, with the object of leaving a free length of shield sub-assembly above the restraint ring. Thus, after the shield sub-assemblies have undergone bending to such an extent that the gap between the restraint ring 38 and the shield sub-assemblies is taken up, the restraint ring becomes effective to produce a measure of support for the shield sub-assemblies while permitting further bending of the free lengths—thereby reducing the bending moments acting at the spikes 24S. FIG. 4 shows two possible levels for the restraint ring 38 (which may be engageable with contact pads 52 on the outermost wrappers 20S as shown in broken outline). The actual vertical position of the restraint ring 38 and its radial spacing from the shield sub-assemblies may be selected according to the free length required after the gap has been taken up and also the degree of full length bending desired before the restraint ring support becomes effective.

Figure 5:
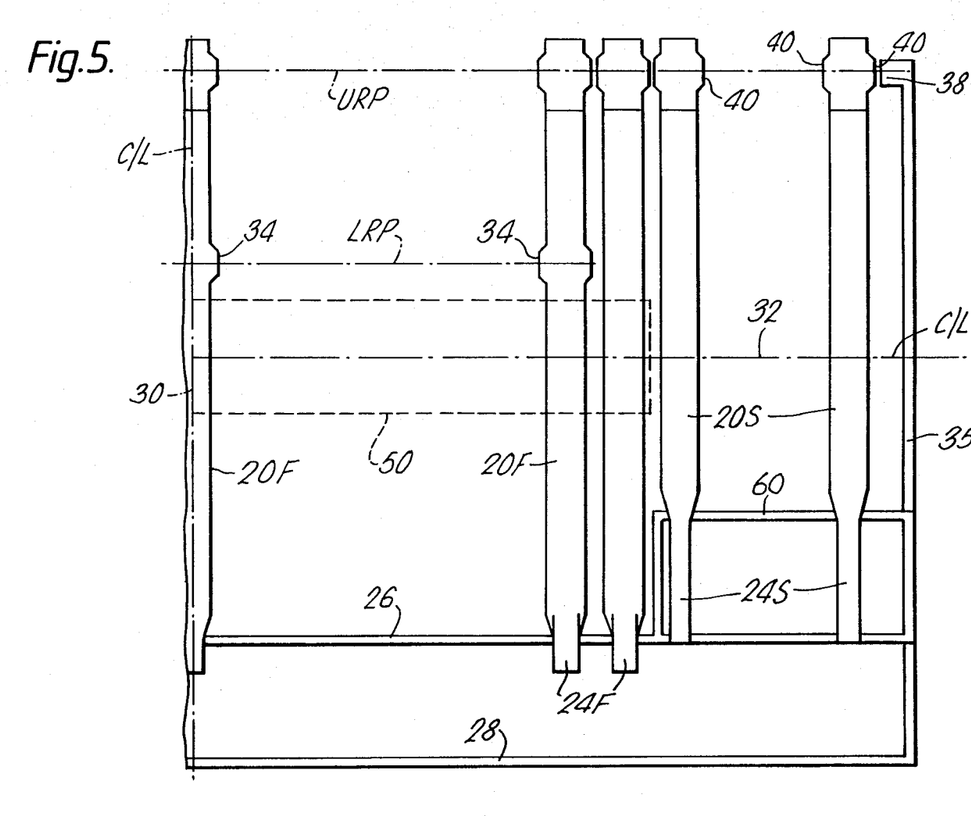

FIG. 5 illustrates a further embodiment of the invention in which the shield sub-assemblies 20S are shortened in length and are engaged with an extension 60 of the diagrid structure. The barrel 35 may be similar to that of FIG. 3 or FIG. 4 or may be omitted as in the embodiment of FIG. 2.

The following features are derivable from the restraint system of the invention. The top end displacements and free bow of the sub-assemblies are less than for a natural restraint system. The interpad loads, especially in the LRP, are reduced compared with the conventional barrel restraint system thereby reducing the risk of pad damage in extreme circumstances, eg seismic conditions. The use of short, articulated spikes in the fuel sub-assembly zones leads to reduced spike reaction loads at the diagrid, compared with the natural restraint system thus making sub-assembly removal less problematic. The combined effect of reduced fuel sub-assembly spike reaction loads and reduced LRP interpad loads is to give reduced extraction loads for fuel sub-assembly withdrawal. Although increased spike reaction loads occur in the shield sub-assembly zones, when compared with a conventional barrel, restraint system, those sub-assemblies do not normally need to be replaceable. In any event, the degree of reaction loading at the shield sub-assembly spikes may be modified according to requirements by the use of a barrel type restraint as disclosed in FIGS. 3 and 4. Other advantages are improved thermal bowing performance, low potential for flow induced vibration of the sub-assemblies and the reduced risk of damage to the mountings for the spikes during replacement of components because of the reduced loadings exerted on the diagrid structure by those components which are replaceable.

The compliant restraint design of the invention also offers more scope to reduce or eliminate the core compaction phase due to thermal bowing (positive thermal bowing reactivity coefficient) than is available with the passive restrained core. This is because in the compliant design of the invention, the shield elements offer less resistance to the bow of breeder sub-assemblies and so less of this bow appears as movement of the core region inwards.

I claim:

1. A nuclear reactor core assembly comprising an array of core sub-assemblies of which a first group forms a central core zone and a second group forms an annular outer core zone surrounding the central core zone, each subassembly of both groups comprising an elongate tubular wrapper provided at its lower end with a spike formation which engages in a support structure for supporting the sub-assemblies of both groups in upright parallel relationship and at its upper end with first abutment surfaces for contact with the corresponding first abutment surfaces of neighbouring sub-assemblies so as to form an upper restraint plane for the sub-assemblies of both groups, characterised in that:

at a level below the upper restraint plane, the wrappers of the first group of sub-assemblies, but not of the second group of sub-assemblies, are each provided with second abutment surfaces for contact with the corresponding second abutment surfaces of neighbouring sub-assemblies of the first group so as to form a lower restraint plane effective only for the sub-assemblies of the first group;

each of the sub-assemblies of the first group has a connection between the wrapper and the respective spike formation allowing tilting of the wrapper relative to the spike formation; and each of the sub-assemblies of the second group has a connection between the wrapper and the respective spike formation which is stiffer than the connection aforesaid so that each second group sub-assembly, being subject by virtue of the stiffer connection to greater restraint against tilting of the wrapper relative to the spike formation, acts as a cantilever beam which, on take up of clearance between the first and second abutment surfaces, radially restrains the sub-assemblies inboard thereof, the radial restraint exerted by the second group sub-assemblies being effective for the first group subassemblies via the upper restraint plane.

2. A core assembly as claimed in claim 1 in which the assembly is devoid of any restraint-exerting restraining ring encircling the second group of sub-assemblies, and the radial restraint exerted by the second group of sub-assemblies is provided exclusively by the inherent bending stiffness of the second group of sub-assemblies.

3. A core assembly as claimed in claim 1 in which the radial restraint provided by the inherent bending stiffness of the second group of subassemblies is supplemented by at least one ring encircling the second group of sub-assemblies with clearance such that restraint supplementation by the ring does not take effect until the core assembly has undergone a predetermined amount of radial expansion.

4. A core assembly as claimed in claim 3 in which the ring is located at the level of the upper restraint plane.

5. A core assembly as claimed in claim 3 in which the ring is located at a level below the upper restraint plane.

6. A core assembly as claimed in claim 1 in which the lower restraint plane is located above the upper boundary of the fissile material-containing zone of the core.

7. A core assembly as claimed in claim 1 in which there is an axial zone of fertile material above the fissile zone of the core and in which the lower restraint plane is located above the upper boundary of the axial zone of fertile material.

8. A core assembly as claimed in claim 1 in which the first group of sub-assemblies is divided into two sub-groups, a first containing fissile fuel and a second containing fertile fuel only, and the second sub-group being arranged to encircle the first sub-group and form a radial blanket of fertile material.

* * * * *